ically pointed out in the

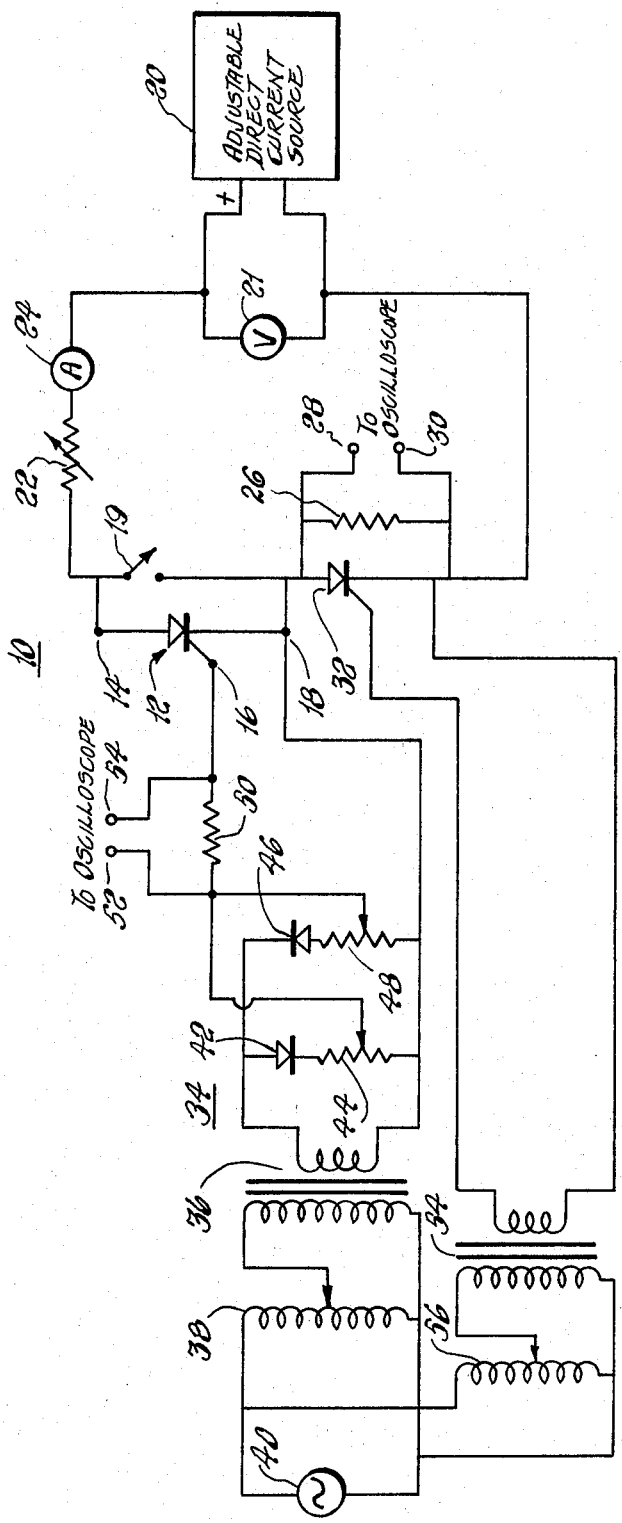

United States Patent Office 3,277,371
Patented Oct. 4, 1966

3,277,371
TEST CIRCUIT FOR EVALUATING TURN-OFF CONTROLLED RECTIFIERS UNDER DYNAMIC CONDITIONS
Carl Marcus, New York, N.Y., Benedict C. Mitchell, Orange, N.J., and Felix L. Marin, Laurelton, N.Y., assignors to the United States of America as represented by the Secretary of the Navy
Filed Sept. 13, 1963, Ser. No. 308,919
3 Claims. (Cl. 324—158)

The invention described herein may be manufactured and used by or for the Government of the United States of America for governmental purposes without the payment of any royalties thereon or therefor.

This invention relates to circuits and methods for ascertaining the characteristics of and for evaluating turn-off controlled rectifiers.

The turn-off controlled rectifier is a solid-state device having anode, gate, and cathode terminals and bears kinship to the silicon controlled rectifier, which is referred to at times as a solid state thyratron. Not only can the turn-off controlled rectifier be triggered to the on state as the silicon controlled rectifier by a positive gate-cathode pulse but it can also be triggered off by a negative gate-cathode pulse. There is discussion of this device in Electronic Equipment Engineering, January 1963, volume II, number I, published by Mactier Publishing Company, New York, New York.

The development of the turn-off controlled rectifier as a power switching device has generated need for circuitry and equipment incorporating such circuitry for the measurement of the important parameters of this device including forward leakage current, forward voltage drop, turn-on voltage, turn-on current, turn-off voltage, and turn-off current. Forward leakage current in this case is the current that flows through anode and cathode when the device is in the off state and rated forward voltage is applied between anode and cathode. Turn-on and turn-off voltages and currents are gate-cathode voltages and currents required for switching.

Measurement of the above-mentioned parameters separately under static conditions reveals the characteristics of the device under static conditions. While the information thus obtained is useful, life testing is necessary for reliability evaluation. Life testing includes fast and continuous repetitive switching between on state and off state and measuring the above-mentioned parameters. The parameters may be measured by interrupting the life test at intervals and taking measurements under static conditions. However, it would be considerably more convenient to measure the above-mentioned parameters without interrupting the life test for the measurements.

An object of this invention is to provide a convenient, reliable, accurate method and apparatus for subjecting a turn-off controlled rectifier device to a life test including continuously switching the device on and off at power frequency, i.e. sixty times per second or other selected switching rate and for supplying rated load current during the on state and for supplying rated forward voltage during the off state and for monitoring any one or combination of forward leakage current, forward voltage drop, turn-on or turn-off voltage or current without interrupting the life test.

A further object is to measure any one or combination of forward leakage current, forward voltage drop, turn-on voltage, turn-on current, turn-off voltage, and turn-off current, of a turn-off controlled rectifier device while the device is periodically switched on and off, conducting predetermined load current during the on state and having predetermined forward voltage applied thereacross during the off state.

Other objects and advantages will appear from the following description of an example of the invention, and the novel features will be particularly pointed out in the appended claims.

The single figure illustrates a test circuit in accordance with this invention. The illustrated test circuit 10 includes a turn-off controlled rectifier device 12 connected in test position, to circuit anode terminal 14, gate terminal 16, and cathode terminal 18. A single pole single throw switch 19 is connected across terminals 14 and 18. In series with the anode and cathode terminals 14 and 18 is an adjustable voltage direct current supply 20 for applying rated forward anode-cathode voltage and forward leakage current to the test device 12 when the latter is in the off state and supplies the load current when the latter is in the on state. A voltmeter 21 is connected across the direct current source. A load current rheostat 22, a load current ammeter 24, and a forward leakage current metering resistor 26 are connected in series with the direct current source and the anode and cathode terminals 14 and 18. Because the leakage current is on the order of microamperes to several milliamperes, the voltage drop across low resistance rheostat 22 is too low for use in measuring the forward leakage current. The metering resistor 26 is a stable resistor of at least several thousand ohms to provide sufficient voltage drop for an oscillographic reading. Terminals 28 and 30 from opposite ends of metering resistor 26 are provided for connection to an oscilloscope, not shown, to indicate forward leakage current. The metering resistor is unwanted in the load circuit during the on state of the test device 12. A silicon controlled rectifier 32 having forward voltage rating and forward current rating at least as high as those of test device 12 is connected across resistor 26 to provide an essentially short circuit path thereacross when the test device 12 is in the on state. The silicon controlled rectifier 32 is gated on in synchronism with the test device 12 and when the test device 12 is gated to the off-state, the silicon controlled rectifier 32 automatically reverts to the off-state as when its anode current drops below its holding current.

The gating circuit 34 for test device 12 includes a variable voltage alternating current supply to accommodate variously rated turn-off controlled rectifiers 12. The alternating current supply shown herein includes a step down transformer 36 coupled to an autotransformer 38 connected to a house current source 40 or other convenient source.

A characteristic of the turn-off controlled rectifier is that the gating power for turn-off is much greater than that for turn-on. The gating circuit includes series connected diode 42 and potentiometer 44 across the secondary of transformer 36 for gating on the test device 12 and series-connected diode 46 and potentiometer 48 across the secondary of transformer 36 for gating off the test device 12. A gate-on current and gate-off current metering resistor 50 is connected at one end to the taps of both potentiometers 44 and 48 and its other end to gate terminal 16. Terminals 52 and 54 connected to opposite ends of metering resistor are provided for connection to an oscilloscope, not shown. The potentiometers 44 and 48 are independently adjustable to provide a waveshape wherein the negative amplitude of the gating voltage is substantially greater than the positive amplitude. The turn-on voltage and turn-off voltage is measured with an oscilloscope, not shown, connected to terminals 16 and 18. The forward voltage drop is measured with an oscilloscope, not shown, connected to terminals 14 and 18.

The silicon controlled rectifier 32 is gated on by a step down transformer 54 and autotransformer 56 connected between alternating current source 40 and the gate and cathode terminals of the silicon controlled rectifier. The terminals of the secondary of transformer 54 are connected to the gate and cathode of silicon controlled rectifier 32 so that it is gated on when the test device 12 is gated on. By adjusting autotransformer 56, the triggering of the silicon controlled rectifier 32 can be adjusted to be in phase with triggering of the turn-off controlled rectifier 12.

When a test device 12 is connected in place, the circuit is adjusted and operated as follows. The direct current source 20 is set to the voltage rating of the test device 12 as indicated by voltmeter 21. Then the switch 19 is closed to shunt the test device and the autotransformer is adjusted in the direction of increasing voltage until the silicon controlled rectifier 32 is gated on. Then switch 19 is opened and potentiometer 44 is adjusted from zero till the test device 12 is turned on. The rheostat 22 is adjusted until the ammeter 24 registers rated forward current for the test device 12. Then potentiometer 48 is adjusted from zero until the test device is turned off at which instant the current registered by ammeter 24 will drop to essentially half the current registered just previous to that. The lengths of the off and on phases can be made equal by adjusting potentiometer 48; this can be monitored by an oscilloscope connected across rheostat 22. The peak turn-on and turn-off voltages will be indicated by an oscilloscope connected across terminals 16 and 18. The respective turn-on and turn-off currents will be indicated by an oscilloscope across metering resistor 50. The forward leakage current is determined from the voltage drop across metering resistor 26 indicated by an oscilloscope connected to terminals 28 and 30.

One oscilloscope may be used for all parameter measurements. The sweep rate of the oscilloscope is synchronized with the gating rate. Peak, average, or RMS meters may be connected for continuously monitoring one or a plurality of the parameters of interest.

The gating voltage is shown derived from an alternating current source for convenience and low cost. However, the gating voltages may be derived from a pulse source, e.g., a multivibrator device.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:
1. A turn-off controlled rectifier analyzer comprising:
 (a) an adjustable voltage direct current source,
 (b) a voltmeter connected across the direct current source,
 (c) a load current adjusting resistor connected in series with the direct current source,
 (d) an ammeter for registering load current,
 (e) and a leakage current metering resistor on the order of several thousand ohms connected in series with the direct current source,
 (f) a silicon controlled rectifier having anode, gate, and cathode, the anode and cathode of said silicon controlled rectifier connected to respective ends of said metering resistor to short circuit the metering resistor during the on state,
 (g) an anode and a cathode terminal for a turn-off controlled rectifier to be analyzed connected in series with the direct current source, ammeter, load current adjusting resistor, parallel connected metering resistor and silicon controlled rectifier,
 (h) said anode and cathode terminals, the anode and cathode of the silicon controlled rectifier, and the negative and positive terminals respectively of the direct current source connected in the same direction around the series loop,
 (i) a shorting switch connected across said anode and cathode terminals,
 (j) an adjustable alternating current supply,
 (k) a pair of diodes,
 (l) the anode of one diode and the cathode of the other diode connected in common to one terminal of the alternating current source,
 (m) two potentiometers,
 (n) the resistances of the potentiometers connected between the other terminal of the alternating current source and the other ends of the respective diodes,
 (o) said other terminal of the alternating current source being connected to the cathode terminal for the turn-off controlled rectifier to be tested,
 (p) a second metering resistor connected at one end to the taps of both potentiometers and at its other end to a gate terminal for the turn-off controlled rectifier to be tested,
 (q) means for measuring turn-on voltage and turn-off voltage connected between said gate and cathode terminals,
 (r) means for measuring turn-on current and turn-off current connected across said second metering resistor,
 (s) means for measuring forward leakage current connected across said first metering resistor,
 (t) and means for measuring forward voltage drop connected between said anode and cathode terminals.

2. A turn-off controlled rectifier analyzer comprising:
 (a) an adjustable voltage direct current source,
 (b) a voltmeter connected across the direct current source,
 (c) a load current adjusting resistor connected in series with the direct current source,
 (d) an ammeter for registering load current and
 (e) a metering resistor on the order of several thousand ohms connected in series with the direct current source,
 (f) a silicon controlled rectifier having anode, gate, and cathode,
 (g) the anode and cathode of said silicon controlled rectifier connected to respective ends of said metering resistor to short circuit the metering resistor durings its on state,
 (h) an anode and a cathode terminal for a turn-off controlled rectifier to be analyzed connected in series with the direct current source, ammeter, load current adjusting resistor, parallel connected metering resistor and silicon controlled rectifier,
 (i) said anode and cathode terminals, the anode and cathode of the silicon controlled rectifier, and the negative and positive terminals, respectively of the direct current source connected in the same direction around the series loop,
 (j) a shorting switch connected across the anode and cathode terminals for the turn-off controlled rectifier to be analyzed,
 (k) a source of periodic alternately positive and negative pulses,
 (l) and first and second independently adjustable means coupled to said source for supplying pulses alternately of opposite polarity and of independently adjustable amplitude between gate and cathode terminals of the turn-off controlled rectifier.

3. A turn-off controlled rectifier analyzer comprising:
 (a) circuit means for connection to a direct current source and to the anode and cathode of a turn-off controlled rectifier to provide rated forward voltage during the off-state and rated forward current during the on state of the turn-off controlled rectifier and for providing a substantial readily measurable voltage drop proportional to the forward leakage current,
 (b) a pair of diodes,
 (c) the anode of one diode and the cathode of the other diode connected in common for connection to one terminal of a source of alternately positive and negative periodic pulses, (d) two potentiometers,
(e) one end of the resistances of the potentiometers connected to the other ends of the diodes respectively,
(f) the resistances of the potentiometers being joined at their free ends for connection to the other terminal of said source and to the cathode of the turn-off controlled rectifier under test,
(g) a metering resistor connected at one end to the taps of both potentiometers in common and at the other end to the gate terminal of the turn-off controlled rectifier.

References Cited by the Examiner

UNITED STATES PATENTS

| | | | |
|---|---|---|---|
| 2,537,589 | 1/1951 | Johnson | 328—26 X |
| 3,144,604 | 8/1964 | Stetzler | 324—158 |

OTHER REFERENCES

G.E. Controlled Rectifier Manual (First Edition), March 1960, pages 198–203.

WALTER L. CARLSON, *Primary Examiner.*

E. L. STOLARUN, *Assistant Examiner.*